Figure 1:
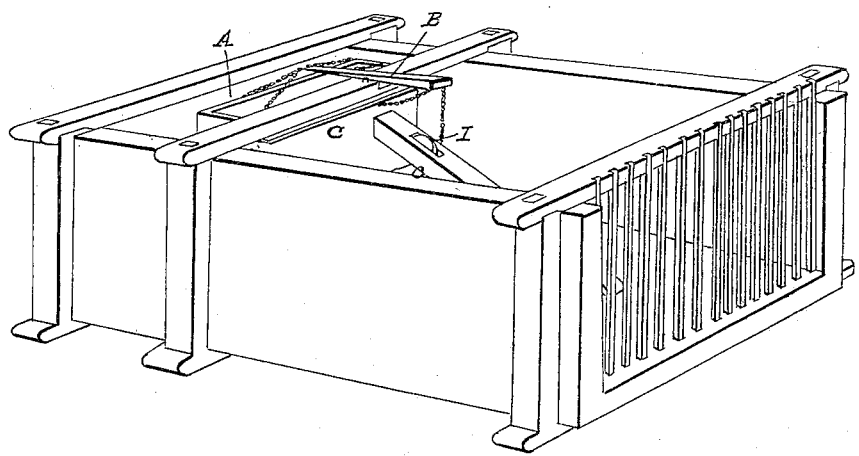
Figure 2:
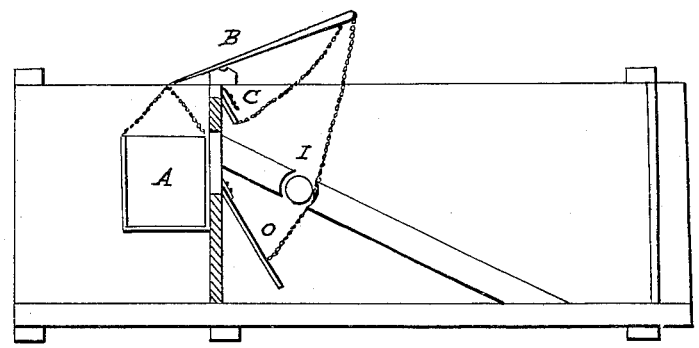

R. ROBINSON.
Water Gate.

No. 2,392. Patented Dec. 14, 1841.

UNITED STATES PATENT OFFICE.

ROBERT ROBINSON, OF GREENE, NEW YORK.

METHOD OF OPENING AND CLOSING WASTE-GATES FOR CANALS AND MILL-DAMS.

Specification of Letters Patent No. 2,392, dated December 14, 1841.

*To all whom it may concern:*

Be it known that I, ROBERT ROBINSON, of Greene, Monroe county, and State of New York, have invented a new and useful machine for the preservation of canal banks and milldams from breaks by overflow of water by the hoisting and shutting of wastewater gates, said machine called the "Canal-Bank and Milldam Preserver," on account of it being self-renovating in such a way as to keep the water within a certain height in case of a flood or overflow of water caused by a sudden freshet; and I do hereby declare that the following is a full, clear, and exact description of the construction and operation of the same, reference being had to the annexed drawings, making a part of this specification, in which—

Figure (1) is a perspective view, and Fig. (2) is a longitudinal elevation.

The nature of my invention consists in hoisting the gates by an over balance accumulated from the surplus water and shutting it by the draft of water through the throat when the balance of water is leaked out of the balance box.

To enable those not skilled in the art to make and use my invented machine I will proceed to describe its construction and operation.

I construct waste weir in the known form then place a lever across a beam as shown at B in the accompanying drawings to one end of the lever I attach two gates C and O and at the other end of said lever I attach a box as shown by letter A in the drawings, said box to be of sufficient size to contain water enough that flows over the flume or bulkhead as it might be called so that when the water rises to a certain height and falls into the box A and the heft of the water in the box A over balances the pressure against the gate O that it hoists the gate O and C, the box A hangs the lower side of the bulkhead or flume as it may be called so that the surplus water passes into it. The said box marked A is to have a leak in the bottom of it so that when the water stops falling in the box A in consequence of the water passing through the throat of the gate O which gate has been hoisted by the heft of water in the box A so that it will empty itself by the leakage and after the box A is emptied the pressure of water against the gate O will close the gate which makes the gate self renovating. Said gates are to be hung by fastenings on the upper edge to the bulkhead and hoisted by pulling the bottom edge right out into the water, the chain that hoists the gate O passes through a small pulley shown by letter I that is in a brace that runs from the bottom of the flume to the bulkhead. The gate C is to be as wide as the water falls in the flume next to the bulkhead in consequence of the gate O being hoisted so that the water will continue to fall into the box A till the flood passes off.

What I claim as my invention and desire to secure by Letters Patent is—

The method of opening and closing the gates by the combination of the gates and box attached to the lever for the purpose above described.

ROBERT ROBINSON.

Witnesses:
ALFRED PHELPS,
THOS. C. CROUCH.